US005204188A

United States Patent [19]

Nitta et al.

[11] Patent Number: 5,204,188

[45] Date of Patent: Apr. 20, 1993

[54] COATED RESIN FILM HAVING EXCELLENT OFFSET PRINTABILITY

[75] Inventors: Katsukuni Nitta, Tokyo; Nobuyuki Yamaguchi, Shizuoka, both of Japan

[73] Assignee: Oji Yuka Goseishi Co., Ltd., Tokyo, Japan

[21] Appl. No.: 744,351

[22] Filed: Aug. 13, 1991

[51] Int. Cl.[5] ............ B32B 27/08

[52] U.S. Cl. ............ 428/476.3; 428/516; 428/518; 428/520; 428/421; 503/200; 503/226; 346/135.1

[58] Field of Search ............ 428/516, 476.3, 518, 428/421, 520; 503/200, 226; 346/135.1

[56] References Cited

U.S. PATENT DOCUMENTS

| | | | |
|---|---|---|---|
| 4,064,304 | 12/1977 | Fujita et al. | 428/511 |
| 4,420,530 | 12/1983 | Toyoda et al. | 428/516 |
| 4,906,526 | 3/1990 | Inoue et al. | 428/516 |
| 5,087,603 | 2/1992 | Izubayashi | 503/226 |

*Primary Examiner*—Edith Buffalow
*Attorney, Agent, or Firm*—Oblon, Spivak, McClelland, Maier & Neustadt

[57] ABSTRACT

A coated resin film having excellent offset printability is described, which comprises a polyolefin resin film base material layer having formed on both the surfaces thereof a solvent permeation preventing layer for preventing the permeation of a solvent in offset printing ink compositions and further having formed on one or both the surfaces of the solvent permeation preventing layers a coating agent layer.

4 Claims, 2 Drawing Sheets

COATED RESIN FILM HAVING EXCELLENT OFFSET PRINTABILITY

FIELD OF THE INVENTION

The present invention relates to a coated resin film having excellent offset printability, which is prevented to cause unevenness and curling of the film with a solvent in an offset ink in the case of applying thereto an offset printing.

BACKGROUND OF THE INVENTION

Since offset printing can easily make multicolor printing, offset printing is used for printing on papers such as art papers, fine papers (i.e., wood-free papers), coated papers, etc., and polyethylene terephthalate films, polyvinyl chloride films, etc.

A drying type offset ink is composed of the composition shown in following Table 1.

TABLE 1

Basic Composition of Offset Printing Ink:

- Offset Ink
  - Main components
    - Pigment
      - Organic pigment
      - Inorganic pigment
    - Vehicle
      - Synthetic resin
      - Vegetable oil (Drying oil)
      - Solvent
  - Auxiliaries
    - Viscosity modifier
      - Solvent
      - Diluted varnish
      - Polymer
    - Drying controlling agent
      - Dryer
      - Drying inhibitor
    - Other additives
      - Wax membrane-reinforcing agent, back stain inhibitor, etc.

Also, as such an offset ink, a universal type offset ink for pulp papers, pulp coated papers, etc., has been generally used. An example of the composition of the universal type offset ink is shown in Table 2 below.

TABLE 2

| | Offset Printing Ink Composition (parts by weight): Universal Type Offset Ink | Offset Ink for Non-Absorbing Materials |
|---|---|---|
| Pigment | 15 to 50 (20) | (25) |
| Resin | 25 to 30 (30) | (30) |
| Drying Oil | 10 to 15 (10) | (34) |
| High-Boiling Petroleum Series Solvent | 20 to 45 (35) | (5) |
| Dryer | 0.5 to 2 (1) | (2) |
| Other Additives | 2 to 5 (4) | (4) |
| Total | 100 | 100 |

The numerals in ( ) are an example of a commercially available article.

As the universal type offset ink, a quick drying ink using the drying oil compounded with a resin and a mineral oil (high-boiling petroleum series solvent) as the vehicle of the offset ink is used in order to shorten drying time.

However, if polyolefin films, synthetic papers composed of stretched polyolefin films containing an inorganic fine powder as described in JP-B-46-40794 (the term "JP-B" as used herein means an "examined Japanese patent publication"), U.S. Pat. No. 4,075,050, British Patent 1,384,556, JP-A-62-227933, JP-A-61-3748, and JP-A-60-79951 (the term "JP-A" as used herein means an "unexamined published Japanese patent application"), or coated papers formed by applying a pigment coated layer on these synthetic papers for improving the drying property of the ink are printed using the foregoing universal type offset ink, a so-called solvent attack that the polyolefin film is swelled with the solvent (in particular, a high-boiling petroleum series solvent such as a mineral oil, etc.) of the offset ink used for universal type offset printing to cause local unevenness on the printed film or to curl the whole film, whereby there is a difficulty for use practically such a universal type offset ink.

Accordingly, as an offset printing ink for a polyolefin film, a specific offset printing ink containing a less amount of a high-boiling petroleum series solvent is used for a non-absorbing material such as a polyolefin film (see Table 2 above).

As one of the methods of preventing swelling of a polyolefin film with a solvent (in particular, a high-boiling solvent) of the universal type offset printing ink, it is considered to form a coating agent (pigment coated) layer on both the surfaces of a polyolefin film.

However, since the content of the solvent in the universal type offset printing ink is from 45 to 70% by weight, the solvent is liable to cause the solvent attack even in the case of employing the foregoing method. Therefore, for sufficiently absorbing the solvent with the coating agent layers for preventing the occurrence of the solvent attack of the polyolefin film, it is necessary that the thickness of each of the coating agent layers on both the surfaces of the polyolefin film is at least 35 μm. However, if the thickness of the coating agent layers on both the surfaces thereof is more than 70 μm, it takes a long time to dry after coating and it increases the cost of the coated resin film. Thus, the foregoing method is not a profitable method.

In the case of carrying out offset printing using such a specific offset printing ink for a polyolefin film, it is difficult to control the balance of the amount of water and the amount of the ink as compared to the case of using the universal type offset printing ink and also the viscosity of the ink is changed on printing machine to reduce the workability. Thus, printers are unwilling to use the printing ink. Accordingly, since printers using the printing ink and ink makers are limited, it has been desired to develop a polyolefin film which can be applied for the universal type offset printing ink on.

That is, in general printers, offset printing is usually applied to a pulp series papers such as a fine paper and a coated paper using the universal type offset printing ink and in only the case of printing on a polyolefin film or a synthetic paper, a specific offset printing ink for such a non-absorbing material must be used.

Accordingly, because a lot of time and a lot of works are required for the change of the printing ink, general printers do not positively print onto polyolefinic films such as synthetic papers, which is one cause of preventing the propagation of polyolefin films or synthetic papers for offset printing.

SUMMARY OF THE INVENTION

The object of this invention is, therefore, to provide a coated polyolefin film which is not deformed by the solvent attack of a universal type offset printing ink even when the thickness of the coating agent layers is thinned.

As the result of various investigations for solving the foregoing object, the inventors have discovered that by forming a solvent permeation preventing layer for preventing the permeation of the solvent in a universal type offset printing ink on both the surfaces of polyolefin film or a polyolefin series synthetic paper and further forming a pigment coated layer (i.e., a coating agent layer) on both the surfaces thereof or the surface thereof being applied with offset printing, when offset multicolor printing is applied using a universal type offset printing ink, the solvent attack such as the occurrence of unevenness on the printing polyolefin film or polyolefin series synthetic paper, or the occurrence of curling of the whole film or paper is reluctant to occur and have succeeded in accomplishing the present invention based on the discovery.

That is, according to the present invention, there is provided a coated resin film having excellent offset printability comprising a polyolefin resin film base material layer having formed on both the surfaces thereof a solvent permeation preventing layer for presenting the permeation of a solvent in offset printing ink components and further having formed on one or both of the solvent permeation preventing layers a coating agent layer.

In the coated resin film having excellent offset printability of this invention, in order to prevent the permeation of a solvent (high-boiling petroleum series solvent) in an offset printing ink, a solvent permeation preventing layer for preventing the permeation of the solvent is formed and further a coating agent layer is formed on the solvent permeation preventing layer is formed, by which the thickness of the coating agent layer can be thinned and even when the surface of the coating agent layer is printed with a universal type offset printing ink, an unevenness and curling of the printed coated-type polyolefin film or polyolefin series synthetic paper are reluctant to occur.

DETAILED DESCRIPTION OF THE INVENTION

Figure 1:
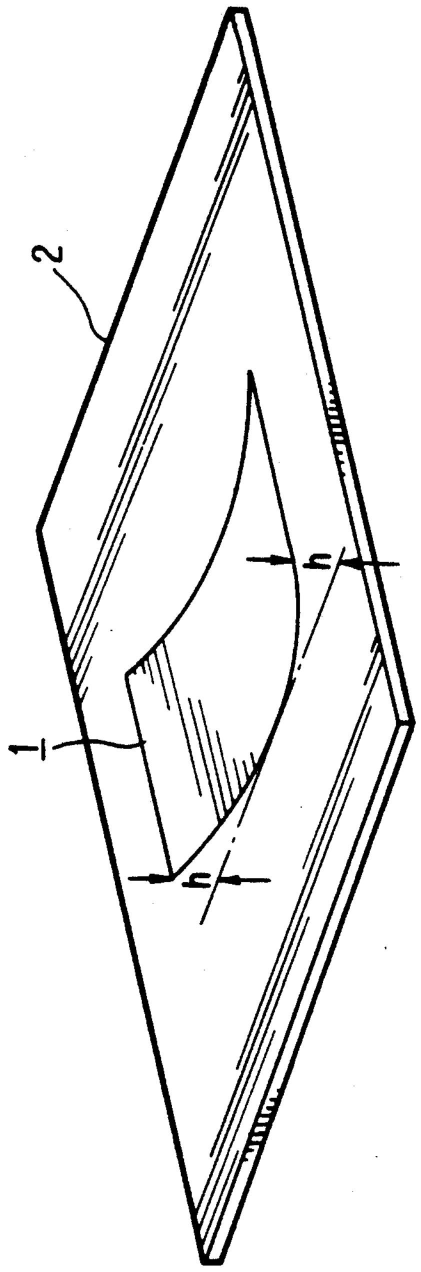
FIG. 1 is a perspective view showing a method of measuring the height of the curl of the printed polyolefin film in the example of this invention.

Then, the invention is explained in detail.

I Layer Structure (1) Polyolefin Resin Film Base Material Layer

As a polyolefin film which is used for a polyolefin resin film base material layer constituting the coated resin film having excellent offset printability of the present invention, there is a film obtained from an polyolefin series resin by various film forming methods such as an inflation forming method, a T-die forming method, or a calendaring method.

Practically, there are a polyolefin film obtained by using a polyolefin resin such as polyethylene, polypropylene, an ethylene-propylene copolymer resin, a polybutene resin, polystyrene, etc., a copolymer such as an ethylene-vinyl acetate copolymer resin, an ethylene-acrylic acid ester copolymer resin, a styrene-polypropylene copolymer, a styrene-polyethylene copolymer resin, etc., singly or as a mixture of two or more kinds thereof, and an opaque or translucent synthetic paper having a number of microvoids in the inside of the film obtained by stretching a polyolefin film containing an inorganic filler.

In these polyolefin films, a synthetic paper obtained by incorporating from 8 to 65% by weight an inorganic fine powder and/or an organic filler in a polyolefin resin obtained by polymerizing or copolymerizing ethylene, propylene, or monomers containing ethylene and propylene as the main components in an amount of at least 50% by weight and by monoaxially stretching or biaxially stretching the polyolefin resin film formed from the mixture (see, the foregoing patent publications).

Such a plyolefin series synthetic paper is commercially available as trade names of Yupo FPG, Yupo KPG, Yupo TPG, Yupo GFG, Yupo CFG, and Yupo SGG, made by Oji Yuka Goseishi Co., Ltd.

The thickness of the polyolefin resin film depends upon the use thereof but is usually from 40 to 500 μm.

(2) Solvent Permeation Preventing Layer

The solvent permeation preventing layer constituting the coated resin film having excellent offset printability of the present invention is formed on both the surfaces of the polyolefin resin film in order to prevent the occurrence of the solvent attack (the occurrence of uneven dots and the occurrence of curling) of the polyolefin resin film with the solvent in an offset printing ink. That is, coating composed of polyvinyl alcohol, polyvinylidene chloride, polyacrylonitrile, polyacrylamide, polyvinyl fluoride, etc., is formed to provide a solvent permeation preventing layer having an excellent solvent resistance to mineral oils and high-boiling petroleum solvent components.

The solvent permeation preventing layer is formed on not only the surface of the polyolefin resin film being offset printed but also the back surface of the film. That is, since printed papers by offset printing are stored in the superposed state of them, the solvent permeation preventing layer formed on the back surface of the paper prevents the permeation of a solvent from the front surface of a printed paper in contact with the back surface thereof during the storage, whereby the occurrence of unevenness and curling of the printed papers.

As the primer forming the solvent permeation preventing layer, there are;

(1) a vinylidene chloride series copolymer which is a copolymer of from 82 to 94% by weight vinylidene chloride and from 18 to 6% by weight other vinyl monomer such as an acrylic acid alkyl ester, acrylonitrile, acrylic acid, etc.;

(2) crosslinking type polyvinyl alcohol composed of polyvinyl alcohol having a saponification degree of from 65 to 100% and compounded with a crosslinking agent;

(3) a copolymer composed of from 35 to 98% by weight acrylamide and/or methacrylamide and from 65 to 2% by weight other vinylic monomer such as an acrylic acid alkyl ($C_1$–$C_8$) ester, a methacrylic acid alkyl ($C_1$–$C_8$) ester, styrene, acrolein, acrylic acid, etc.;

(4) a copolymer composed of from 20 to 55% by weight acrylonitrile and from 80 to 45% by weight other vinylic monomer such as an acrylic acid alkyl ($C_1$–$C_8$) ester, a methacrylic acid alkyl ($C_1$–$C_8$) ester, styrene, α-methylstyrene, acrylic acid, itaconic acid, vinyl acetate, etc.;

(5) a polyfluoride resin such as polyethylene difluoride, an ethylene difluoride-ethylene tetrafluoride copolymer, etc.;

(6) a copolymer composed of from 1 to 10% by weight N-methylolacrylamide, acrylamide, methacrylamide, etc.; from 5 to 30% by weight acrylonitrile; and from 85 to 60% by weight other vinylic monomer such as an acrylic acid alkyl ($C_1$–$C_8$) ester, a methacrylic acid alkyl ($C_1$–$C_8$) ester, acrylic acid, methacrylic acid, etc.; and (7) an aqueous solution of the foregoing resin, an emulsion of the foregoing resin, or a solution of the resin dissolved in a solvent such as toluene, a mineral spirit, petroleum, etc.

The thickness of the solvent permeation preventing layer depends upon the resin being used but is generally from 0.5 to 15 μm, and preferably from 3 to 10 μm.

(3) Coating Agent Layer

For the coating agent layer for improving the drying property of an offset printing ink, a pigment coating agent which is usually used as a coating agent for a coated paper is used. Such a coating agent is generally composed of from 50 to 90% by weight an inorganic fine powder and from 50 to 10% by weight (as solid components) an emulsion type or water-soluble type resin binder as the main components. If necessary, the coating agent may contain from 0.05 to 5% by weight antistatic agent such as an anionic-surfactant, a cationic-surfactant, and a nonionic-surfactant.

As such an inorganic fine powder, there are fine powders of calcium carbonate, satin white, silica, titanium oxide, alumina, clay, talc, aluminum hydroxide, zinc white, iron oxide, etc, and fine powders of pigments, etc.

The particle sizes of the inorganic fine powder are not larger than 15 μm, and particularly preferably from 0.1 to 10 μm.

Furthermore, fine particles of an organic coloring agent or polystyrene, etc., which is called as plastic pigment may be added to the inorganic fine powder.

As the resin binder, there are resin emulsions such as an ethylene-vinyl acetate copolymer emulsion, an ethylene-vinyl acetate-vinyl chloride copolymer emulsion, a vinyl acetate-acrylic acid ester copolymer emulsion, a styrene-butadiene rubber emulsion, an ordinary temperature crosslinking type acrylic resin aqueous emulsion, a urethane resin aqueous emulsion, etc., an aqueous solution of a water-soluble high molecular compound such as starch, carboxymethyl cellulose, polyvinylpyrrolidone, etc. They can be used singly or as a mixture of them.

In addition to the inorganic fine powder and the resin binder, a small amount of a solvent, etc., can be used for facilitating coating. Furthermore, the coating composition may contain coloring agents, antiseptics, fluidity improving agents, wetting agents, membrane-forming aids, defoaming agents, plasticizers, etc.

As the coating system for the coating agent, an ordinary coating system may be employed.

The polyolefin film thus coated is dried to form the coated layer on the front surface or both the surfaces of the film base material.

The thickness of the coated agent layer is generally from 3 to 30 μm, preferably from 5 to 20 μm.

II Offset Printing

The coated-type polyolefin film having excellent offset printability of this invention thus obtained is applied with offset printing by attaching an offset printing ink onto the front surface thereof.

(1) Offset Ink

Such an offset ink is fundamentally composed of the main components comprising a pigment and a vehicle and the auxiliaries comprising a viscosity modifier, a drying controlling agent, and other additives as shown in Table 1 and Table 2 described above.

The coated resin film of this invention can be used not only for a universal offset printing ink but also for an offset printing ink for a non-absorbing material.

As the foregoing pigment, there are azo pigments such as lithol red, benzidine yellow, etc.; lake pigments such as permanent green, permanent rhodamine, permanent blue, Lake Red C, etc.; organic pigments such as Brilliant Carmine 6B, phthalocyanine blue, etc.; and inorganic pigments such as alumina, barium sulfate, red iron oxide, chrome yellow, Prussian blue, titanium white, carbon black, etc.

Also, as the vehicle, there are synthetic resins, vegetable oil (drying oil), solvents, etc.

Practical examples of the vehicle are;

(1) linseed oil type vehicles such as linseed oil, stand oil, etc., and alkyd type vehicles such as drying oil-modified alkyd resins, etc., and (2) a quick drying resin type vehicle mainly composed of a resin varnish prepared by dissolving a rosin-modified phenol resin in a mixture of linseed oil and tung oil or a low-viscosity linseed oil varnish and controlling the viscosity thereof by the addition of petroleum fractions having a narrow boiling point range.

As the viscosity modifiers, they contain solvents, diluted varnishes, polymers, etc.

Also, as the drying controlling agents, they contain dryers, drying inhibitors, etc.

As other components, there are waxes, membrane-reinforcing agents, back stain preventing agents, etc.

(2) Offset Printing Method

For offset printing, the polyolefin film having excellent offset printability of this invention with the foregoing offset printing ink, printing can be similarly carried out as ordinary offset printing using an offset printing machine.

Then, the invention is explained in more detail by referring to the following examples and comparison examples. In addition, in the examples, all parts and %, unless otherwise indicated, are by weight.

(A) Production examples of polyolefin resin film base material layers:

PRODUCTION EXAMPLE (A)-1

A composition composed of 45 parts of polypropylene, "Noblen MA-6" (melting point 164° C.) (trade name, made by Mitsubishi Petrochemical Co., Ltd.), 32 parts of polyethylene "Yukalon Hard EY-40" (trade name, made by Mitsubishi Petrochemical Co., Ltd.), 5 parts of maleic anhydride graft polypropylene, and 18 parts of heavy calcium carbonate was melt kneaded using an extruding machine, extruded from a die into a film form at a temperature of 200° C., stretched to 5 times in the lengthwise direction at 133° C. and to 8 times in the width direction at 155° C., and then subjected to a corona discharging treatment to provide a synthetic paper (thickness of 100 μm) composed of a fine-porous single layer biaxilially stretched film.

PRODUCTION EXAMPLE (A)-2

A composition composed of 95 parts of a high-density polyethylene "Yukalon Hard EY-40" (trade name, made by Mitsubishi Petrochemical Co., Ltd.), 5 parts of an ethylene-acrylic acid copolymer, and 25 parts of diatomaceous earth was stretched to 5 times in the lengthwise and width directions to form a fine-porous high-density polyethylene series biaxially stretched film of 90 μm in thickness and the film was subjected to a corona discharging treatment.

PRODUCTION EXAMPLE (A)-3

A composition composed of 80 parts of polypropylene "Mitsubishi Noblen MA-6" (trade name, made by Mitsubishi Petrochemical Co., Ltd.), 10 parts of high-density polyethylene "Yukalon Hard EY-40" having a melting point of 130° C. (trade name, made by Mitsubishi Petrochemical Co., Ltd.), and 10 parts of heavy calcium carbonate powder "Maruo Super 5S" (trade name, made by Maruo Calcium K.K.) was melt-kneaded using an extruding machine, extruded through a die into a film form at a temperature of 200° C., and then cooled to a temperature of about 50° C. Then, after heating the film to about 135° C., the film was stretched to 5 times in the lengthwise direction by utilizing the circumferential speed difference of the roll group.

On the other hand, a composition composed of 55 parts of polypropylene having a melting point of 164° C. "Mitsubishi Noblen MA-3" (trade name, made by Mitsubishi Petrochemical Co., Ltd.), 5 parts of maleic anhydride graft polypropylene, and 40 parts of a heavy calcium carbonate powder having a mean particle size of 1.3 μm was melt-kneaded using other two extruding machines, formed through dies into film form at 200° C., and laminated on both the surfaces of the foregoing monoaxially (lengthwise direction) stretched film. Then, after once cooling the assembly to a temperature of 20° C. higher than room temperature, the assembly was heated again to a temperature of about 150° C., stretched to 8 times in the width direction using a tenter, passed through a oven heated to a temperature of 160° C. to be heat set, and further subjected to a corona discharging treatment to provide a three-layer structure synthetic paper (100 μm in thickness) composed of an interlayer composed of the biaxially stretched film of 50 μm in thickness and monoaxially stretched film of 25 μm in thickness formed at both the surfaces of the interlayer.

(B) Production method of primer (solvent permeation preventing layer forming agent):

PRODUCTION EXAMPLE (B)-1

Aqueous solution of an acrylamide copolymer

After compounding 100 parts of a vinyl monomer mixture composed of 22 parts of acrylamide, 35 parts of acrylonitrile, 35 parts of methyl methacrylate, and 8 parts of N-methylolacrylamide with 120 parts of water, 5 parts of isopropanol, 0.5 part of the sulfuric acid half ester of p-nonylphenol, 0.4 part of 25 mols ethylene oxide addition product of p-nonylphenol, and 0.7 part of potassium persulfate, the resultant mixture was added dropwise to a flask and the emulsion polymerization was carried out for 4 hours at 90° C.

Then, after cooling the product to normal temperature, pH thereof was controlled to 7 to 8 by neutralizing with aqueous ammonia.

PRODUCTION EXAMPLE (B)-2

Acrylonitrile series resin aqueous emulsion

In a reaction vessel equipped with a temperature controller, an anchor-form stirrer, a reflux condenser, a supplying vessel, a thermometer, and a nitrogen inlet conduit were charged the following raw materials.

| | |
|---|---|
| Water | 200 parts |
| Aqueous 35% solution of the sodium salt (anionic emulsifier) of the sulfuric acid half ester of p-nonylphenol formed by reacting with 20 moles of ethylene oxide | 5 parts |
| 20% Solution of p-nonylphenyl (nonionic emulsifier) formed by reacting with 25 moles of ethylene oxide | 20 parts |
| As supply I, the following mixture was used. | |
| Water | 200 parts |
| 35% Solution of the foregoing anionic emulsifier | 25 parts |
| Acrylonitrile | 175 parts |
| n-Butyl Acrylate | 310 parts |
| Acrylic Acid | 15 parts |

As supply II, a solution of 2.5 parts of potassium persulfate dissolved in 85 parts of water was prepared.

After replacing the inside of the reaction vessel with a nitrogen gas, 10% of foregoing supply I was added to the charged mixture in the reaction vessel and the resultant mixture was heated to 90° C.

Then, 10% of foregoing supply II was poured into the reaction vessel and further remaining supply I and supply II were uniformly and simultaneously supplied to the reaction vessel over a period of from 3 to 3.5 hours. Thereafter, the resultant mixture was kept at 90° C. as they were for 1.5 hours and then the reaction vessel was cooled to room temperature to provide a dispersion. Then, pH of the dispersion was adjusted to from 7 to 8 with aqueous ammonia to provide an aqueous dispersion having 50% solid components.

PRODUCTION EXAMPLE (B)-3

Aqueous solution of crosslinking type polyvinyl alcohol

An aqueous solution of 20% polyvinyl alcohol having a saponification degree of 96% compounded with a methylolated melamine resin was used.

PRODUCTION EXAMPLE (B)-4

Vinylidene chloride series copolymer emulsion

An aqueous emulsion of a vinylidene chloride (92%)-methyl acrylate (4%)-acrylonitrile (3%)-acrylic acid (1%) copolymer was used.

PRODUCTION EXAMPLE (B)-5

Polyvinylidene fluoride solution

A dimethylformamide solution of a vinylidene difluoride resin was used.

PRODUCTION EXAMPLE (B)-6

Acrylamide copolymer

By reacting 8 parts of acrylamide, 1.5 parts of diacetoneacrylamide, 0.5 part of laurel methacrylate, 1.5 parts of isopropyl alcohol, 80 parts of water, and 0.05 part of potassium persulfate for 3 hours at 55° C., an aqueous solution of an acrylamide copolymer was obtained.

Then, the examples of the present invention are described below.

EXAMPLE 1

Both the surfaces of the synthetic paper composed of the fine-porous biaxially stretched film obtained in Production Example (A)-1 of foregoing (A) were coated with the aqueous solution of the acrylamide series copolymer obtained in Production Example (B)-1 of foregoing (B) in such an amount that a dry thickness became 3 μm each, after drying the layers (anchor coat layers) at normal temperature, the following coating agent (composition) was coated on the surfaces of both the anchor coat layers in such an amount that a dry thickness became 8 μm each, and dried for one minute at 70° C. to provide a coated paper.

(C) Coating Agent (composition):

| | |
|---|---|
| Styrene-butadiene Rubber Latex | 35 parts |
| Starch | 10 parts |
| Antistatic Agent (10% aqueous soln.) | 10 parts |
| Calcium Carbonate | 30 parts |
| Titanium White (titanium oxide) | 10 parts |
| Clay | 60 parts |
| Dispersing Agent (sodium tripoly-phosphate) | 0.5 part |
| Defoaming Agent (San-Nopco SN-DF-113, trade name, made by San-Nopco Co., Ltd.) | 0.1 part |

(D) Evaluation:

To the coated type synthetic paper thus prepared was applied multicolor offset printing using universal offset printing inks (mainly composed of linseed oil, a mineral oil, pigments, and a resin) for a pulp paper of Graph G type magenta, cyan, black, and yellow 4 color inks, made by Dainippon Ink and Chemicals, Inc. by an offset printing machine.

After allowing to stand 1,000 prints thus obtained in a superposed state for 60 minutes, the presence of the occurrence of unevenness was determined on each print (A2 size, 420 mm×594 mm).

Also, onto all over the coated type synthetic paper was applied printing using a quick drying type offset ink "New Best One Process Black M", trade name, made by Toka Shikiso K.K. at a transfered amount of 1 g/m$^2$.

After allowing to stand 1,000 prints thus formed in a superposed state for 60 minutes, 3 prints were to out, cut into a size of 12 cm×5 cm, after allowing to place the prints on a desk for one day, and the presence of curling of each print was measured as shown in FIG. 1, wherein a print 1 was placed on a plate 2 and h was the height of curling.

The results of measuring the presence of curling are shown in Table 3 below.

COMPARISON EXAMPLE 1

Figure 2:
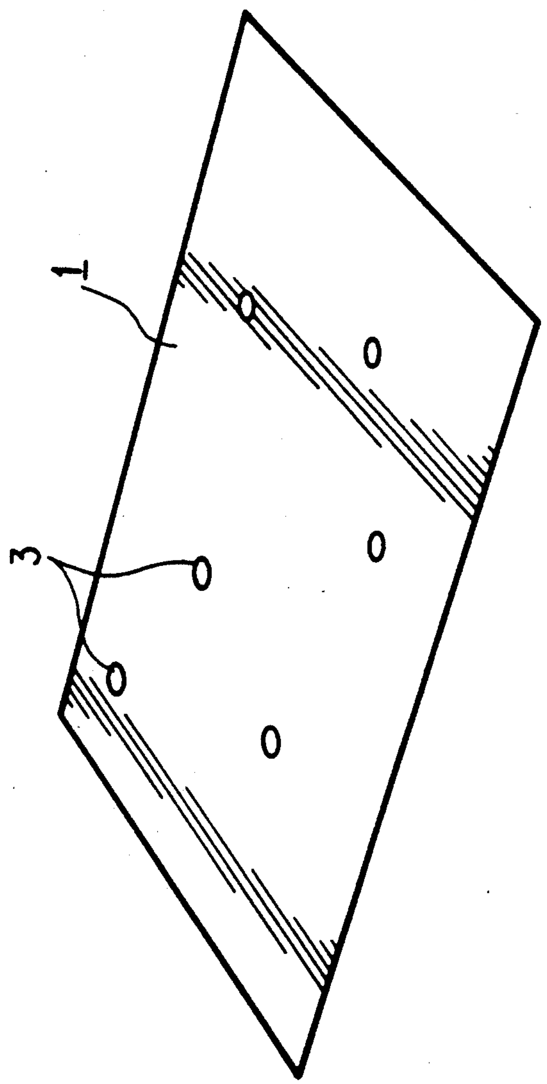
FIG. 2 is a perspective view of an offset multicolor printed polyolefin film having unevenness caused by a vehicle in an offset printing ink.

Onto the synthetic paper composed of the biaxially stretched film obtained in Production Example (A)-1 of foregoing (A) was directly applied the same multicolor offset printing as in Example 1 and the presence of curling and the presence of unevenness shown in FIG. 2 were determined. The results obtained are shown in Table 3 below, wherein convexed or concaved portions 3 were formed on a print 1.

COMPARISON EXAMPLE 2

By following the same procedure as Example 1 except that the acrylamide series resin primer layer was not formed a coated paper was obtained.

On the coated paper, the printability of the universal type offset printing inks was similarly evaluated. The result obtained is shown in Table 3 below.

EXAMPLE 2

Both the surfaces of the high-density polyethylene film obtained in Production Example (A)-2 of foregoing (A) were coated the aqueous solution of the crosslinking type polyvinyl alcohol obtained in Production Example (B)-3 of foregoing (B) in such an amount that a dry thickness became 5 μm each and after drying, the coating agent (composition) shown below was coated on the surfaces of both the coated layers of the crosslinking type polyvinyl alcohol followed by drying to provide a coated paper having coated layers each having a thickness of 8 μm on both the surfaces.

| Coating Agent Composition: | |
|---|---|
| SBR Latex (solid components 50%) | 32 parts |
| Acrylic Acid Ester Series Resin Latex (solid components 50%) | 11 parts |
| Clay | 70 parts |
| Calcium Carbonate Having Particle Sizes of 1.5 μm | 25 parts |
| Titanium Oxide | 5 parts |
| Aqueous Solution of ST-1100* (solid components 4%) | 12 parts |
| Dispersing Agent | 1 parts |

*Water-soluble acrylic resin antistatic agent made by Mitsubishi Petrochemical Co., Ltd.

EXAMPLE 3

Both the surfaces of the three-layer structure synthetic paper obtained in Production Example (A)-3 of foregoing (A) were coated with an aqueous emulsion of the acrylonitrile resin obtained in Production Example (B)-2 of foregoing (B) in such an amount that a dry thickness became 4 μm each and dried.

Then, the coating agent composition used in Example 1 was coated on both the surfaces of the coated paper in such an amount that a dry thickness became 8 μm each and dried to provide a coated paper.

EXAMPLES 4 TO 7 AND COMPARISON EXAMPLES 3 TO 5

By changing the polyolefinic resin film, the primer, and the kind and the coated thickness of the coating agent as in Table 3 shown below, coated papers were obtained and on each of the coated papers the multicolor printability by the universal type offset printing inks as in Example 1 was evaluated.

The results obtained are shown in Table 3.

In addition, the drying property of the offset printing ink shown in Table 3 is shown by the dried time of the ink transferred to the subsequent step (e.g., bookbinding, folding, etc.) after offset printing.

TABLE 3

| Example | Comp. Example | Comp. Example | Example | Example | Comp. Example |
|---|---|---|---|---|---|

TABLE 3-continued

| | 1 | 1 | 2 | 2 | 3 | 3 |
|---|---|---|---|---|---|---|
| Base Material Thick Layer (A) | | | | | | |
| Ex. (A)-1 Single Layer Biaxially Stretched Film | 100 | 100 | 100 | — | — | — |
| Ex. (A)-2 Polyethylene Film | — | — | — | 90 | — | — |
| Ex. (A)-3 Three-layer Stretched Film | — | — | — | — | 100 | 100 |
| Solvent Permeation Preventing Layer (B) | | | | | | |
| Component | | | | | | |
| Ex. (B)-1 Acrylamide Copolymer | 3 μm | — | — | — | — | — |
| Ex. (B)-2 Acrylonitrile Series Resin | — | — | — | — | 4 μm | 4 μm |
| Ex. (B)-3 Crosslinking Type Polyvinyl Alcohol | — | — | — | 5 μm | — | — |
| Ex. (B)-4 Vinylidene Chloride Series Copolymer | — | — | — | — | — | — |
| Ex. (B)-5 Polyvinylidene Fluoride | — | — | — | — | — | — |
| Ex. (B)-6 Acrylamide Copolymer | — | — | — | — | — | — |
| Applied Portion (front/back) | front/back | — | — | front/back | front/back | front only |
| Coating Agent Layer (°C.) | | | | | | |
| Component (Part) | | | | | | |
| SBR | 35 | — | 35 | 32 | 35 | 35 |
| Acrylic Acid Ester Series Resin | — | — | — | 11 | — | — |
| Starch | 10 | — | 10 | — | 10 | 10 |
| Antistatic Agent ST-1100 | 10 | — | 10 | 12 | 10 | 10 |
| Calcium Carbonate | 30 | — | 30 | 25 | 30 | 30 |
| Clay | 60 | — | 60 | 70 | 60 | 60 |
| Titanium Oxide | 10 | — | 10 | 5 | 10 | 10 |
| Dispersing Agent | 0.5 | — | 0.5 | 1 | 0.5 | 0.5 |
| Defoaming Agent | 0.1 | — | 0.1 | — | 0.1 | 0.1 |
| Applied Portion (front/back) | front/back | — | front/back | front/back | front/back | front/back |
| Layer Thickness (μm) | 8/8 | — | 8/8 | 8/8 | 8/8 | 8/8 |
| Evaluation of Coated Paper | | | | | | |
| Layer Thickness (μm) | 122 | 100 | 116 | 116 | 124 | 120 |
| Density (g/cm$^3$) | 0.74 | 0.65 | 0.73 | 0.88 | 0.89 | 0.89 |
| Opaque Extent (%) | 94 | 93 | 94 | 93 | 95 | 95 |
| Printability | | | | | | |
| Occurrence of Curling | None | Occurred | Occurred | None | None | Occurred |
| Occurrence of Unevenness | None | Occurred | Occurred | None | None | Occurred |
| Ink Drying Property (min) | 30 | 200 | 30 | 40 | 30 | 30 |

| | Comp. Example 4 | Example 4 | Example 5 | Example 6 | Example 7 | Comp. Example 5 |
|---|---|---|---|---|---|---|
| Base Material Thick Layer (A) | | | | | | |
| Ex. (A)-1 Single Layer Biaxially Stretched Film | — | — | — | — | — | — |
| Ex. (A)-2 Polyethylene Film | — | — | — | — | — | 90 |
| Ex. (A)-3 Three-layer Stretched Film | 100 | 100 | 100 | 100 | 100 | — |
| Solvent Permeation Preventing Layer (B) | | | | | | |
| Component | | | | | | |
| Ex. (B)-1 Acrylamide Copolymer | — | — | — | — | 10 μm | — |
| Ex. (B)-2 Acrylonitrile Series Resin | — | — | — | — | — | — |
| Ex. (B)-3 Crosslinking Type Polyvinyl Alcohol | — | — | — | — | — | — |
| Ex. (B)-4 Vinylidene Chloride Series Copolymer | — | 6 μm | — | — | — | — |
| Ex. (B)-5 Polyvinylidene Fluoride | — | — | 5 μm | — | — | — |
| Ex. (B)-6 Acrylamide Copolymer | — | — | — | 5 μm | — | — |
| Applied Portion (front/back) | — | front/back | front/back | front/back | front/back | — |
| Coating Agent Layer (°C.) | | | | | | |
| Component (Part) | | | | | | |
| SBR | 35 | 35 | 35 | 35 | 35 | 35 |
| Acrylic Acid Ester Series Resin | — | — | — | — | — | — |
| Starch | 10 | 10 | 10 | 10 | 10 | 10 |
| Antistatic Agent ST-1100 | 10 | 10 | 10 | 10 | 10 | 10 |
| Calcium Carbonate | 30 | 30 | 30 | 30 | 30 | 30 |
| Clay | 60 | 60 | 60 | 60 | 60 | 60 |
| Titanium Oxide | 10 | 10 | 10 | 10 | 10 | 10 |
| Dispersing Agent | 0.5 | 0.5 | 0.5 | 0.5 | 0.5 | 0.5 |
| Defoaming Agent | 0.1 | 0.1 | 0.1 | 0.1 | 0.1 | 0.1 |
| Applied Portion (front/back) | front/back | front/back | front/back | front/back | front | front/back |
| Layer Thickness (μm) | 8/8 | 10/10 | 6/6 | 10/10 | 6 | 25/25 |
| Evaluation of Coated Paper | | | | | | |
| Layer Thickness (μm) | 116 | 132 | 122 | 130 | 126 | 140 |
| Density (g/cm$^3$) | 0.88 | 0.89 | 0.89 | 0.89 | 0.89 | 0.89 |
| Opaque Extent (%) | 95 | 95 | 95 | 95 | 95 | 95 |

TABLE 3-continued

| | | | | | | |
|---|---|---|---|---|---|---|
| Printability | | | | | | |
| Occurrence of Curling | Occurred | None | None | None | None | Occurred |
| Occurrence of Unevenness | Occurred | None | None | None | None | Occurred |
| Ink Drying Property (min) | 30 | 30 | 30 | 30 | 30 | 30 |

While the invention has been described in detail and with reference to specific embodiments thereof, it will be apparent to one skilled in the art that various changes and modifications can be made therein without departing from the spirit and scope thereof.

What is claimed is:

1. A coated resin film having excellent offset printability, comprising a polyolefin resin film base material layer, solvent permeation preventing layers, for preventing the permeation of a solvent in offset printing ink compositions, formed on both surfaces of the base material layer, and a pigmented coating agent layer further formed on one or both of the solvent permeation preventing layers.

2. The coated resin film as claimed in claim 1, wherein the solvent permeation preventing layer for preventing the permeation of a solvent in the offset printing ink comprises at least one kind of resin selected from a cross-linked polyvinyl alcohol, an acrylonitrile copolymer containing from 20 to 55% acrylonitrile, an acrylamide copolymer containing from 35 to 98% by weight acrylamide, polyvinylidene chloride, and polyvinylidene fluoride.

3. The coated resin film as claimed in claim 1, wherein the thickness of the solvent permeation preventing layer is from 0.5 to 15 μm.

4. The coated resin film as claimed in claim 1, wherein the pigmented coating agent layer comprises from 50 to 90% by weight on a dry weight basis of an inorganic fine powder and from 50 to 10% by weight on a dry weight basis of resin binder.

* * * * *